US011116181B2

(12) United States Patent
Ma

(10) Patent No.: US 11,116,181 B2
(45) Date of Patent: Sep. 14, 2021

(54) PET INSECT REPELLER

(71) Applicant: SunSun Electronic Technology Inc., Boulder, CO (US)

(72) Inventor: Huixin Ma, Boulder, CO (US)

(*) Notice: Subject to any disclaimer, the term of this patent is extended or adjusted under 35 U.S.C. 154(b) by 200 days.

(21) Appl. No.: 16/446,617

(22) Filed: Jun. 19, 2019

(65) Prior Publication Data

US 2020/0260693 A1 Aug. 20, 2020

(30) Foreign Application Priority Data

Feb. 18, 2019 (CN) .......................... 201920208637.8

(51) Int. Cl.
*A01K 27/00* (2006.01)
*A01M 1/20* (2006.01)

(52) U.S. Cl.
CPC ......... *A01K 27/007* (2013.01); *A01M 1/2022* (2013.01); *A01M 1/2061* (2013.01)

(58) Field of Classification Search
CPC . A01K 27/007; A01K 13/003; A61M 35/003; A61M 35/00; A61M 35/10; A61M 2250/00; A01M 1/20; A01M 1/2022; A01M 1/2061
See application file for complete search history.

(56) References Cited

U.S. PATENT DOCUMENTS

| 4,604,971 A * | 8/1986 | Baker | A01K 13/003 119/605 |
| 6,449,818 B1 * | 9/2002 | Fildan | A44B 11/001 2/265 |
| 8,393,060 B2 * | 3/2013 | Morhain | A01M 1/2055 24/625 |
| 2002/0062541 A1 * | 5/2002 | Fildan | A44B 11/001 24/578.1 |
| 2010/0186198 A1 * | 7/2010 | Morhain | A44B 11/266 24/163 K |
| 2010/0272767 A1 * | 10/2010 | Koele | A01M 1/2061 424/403 |
| 2017/0311585 A1 * | 11/2017 | Shearer | A01M 31/008 |
| 2019/0254797 A1 * | 8/2019 | Gordon | A01K 27/007 |

\* cited by examiner

*Primary Examiner* — Kristen C Hayes
(74) *Attorney, Agent, or Firm* — Prakash Nama; Global IP Services, PLLC

(57) ABSTRACT

Disclosed is a pet insect repeller, tied to the neck of a pet by a strap, comprising a housing, and a battery, a circuit board and a heating portion mounted inside the housing. The battery and a heating plate are respectively connected to the circuit board. One side of the housing is provided with a plurality of through volatilization holes. The heating portion is provided with a drug carrying member that is loaded with a biological active component. The battery is used to provide an operating current for the heating portion. After the battery is turned on, the heating portion generates heat to heat the drug carrying member. After the temperature of the drug carrying member rises, the biological active component is volatilized and diffused to the body surface of a pet through the volatilization holes. By adopting the above technical solution, there will no harm to the pet.

9 Claims, 5 Drawing Sheets

PET INSECT REPELLER

BACKGROUND OF THE INVENTION

The present utility model relates to a pet product, and in particular, to a pet insect repeller.

Pets such as dogs and cats have a long history in China and other countries. With the improvement of people's living standards, the number of rare dog and cat pets has gradually increased. Many families have treated pets as a family member, and pet owners are paying more and more attention to the quality of life of pets. Ectoparasites are common diseases in dogs and cats. Currently, a small number of pet external insect repellents on the market are mainly applied to the surface of pets. These drugs have relatively serious side effects, and usually require necessary measures, such as an Elizabeth hood, to prevent pets from licking hairs. It is very inconvenient to use, and it is also harmful to pets.

BRIEF SUMMARY OF THE INVENTION

An object of the present utility model is to provide a pet insect repeller.

According to an aspect of the present utility model, a pet insect repeller is provided. The pet insect repeller, tied to the neck of a pet by a strap, includes a housing, and a battery, a circuit board and a heating portion mounted inside the housing, wherein the battery and a heating plate are respectively connected to the circuit board; the circuit board is provided with an electronic circuit for performing power management on the battery and switch control on the heating portion; a side of the housing, close to the pet, is provided with a plurality of through volatilization holes; the heating portion is provided with a drug carrying member that is loaded with a biological active component; the biological active component has a repellent and killing effect on pet surface parasites; the battery is used to provide an operating current for the heating portion; after the battery is turned on, the heating portion generates heat to heat the drug carrying member; and after the temperature of the drug carrying member rises, the biological active component is volatilized and diffused to the body surface of the pet through the volatilization holes, kills the pet surface parasites, and provides chemical protection for the pet.

According to the pet insect repeller adopting the above technical solution, the biological active component is diffused to the body surface of the pet by heating and volatilizing, and will not be exposed. The pet does not ingest it while licking hairs. It is unnecessary to take coercive measures such as an Elizabeth hood. The pet insect repeller is very convenient to use and will not harm the pet.

Further, the heating portion mainly includes a heating member, the heating member being connected to the circuit board, the heating member being disposed at the bottom of a mounting groove, the mounting groove being open toward the volatilization hole, and the drug carrying member being mounted in the mounting groove with a bottom attached to the heating member. The drug carrying member is placed at the bottom of the mounting groove, the mounting groove can function for heat preservation, the temperature rise rate of the drug carrying member can be increased, and the temperature holding time can be prolonged.

Further, the heating member is connected to a temperature control switch for detecting the temperature of the heating member, the temperature control switch powering off the heating member when the temperature of the heating member rises to a predetermined temperature, and powering on the heating member when the temperature of the heating member is lower than the predetermined temperature, so as to maintain the temperature of the heating member within a certain range. Thus, the temperature of the drug carrying member can be effectively controlled, and the biological active component therein can be uniformly volatilized, so as to obtain a relatively stable repellent and killing effect.

Specifically, a predetermined temperature at which the temperature control switch operates is 60° C. Thus, the temperature of the heating member can be stabilized in an appropriate range.

Preferably, the temperature of the heating member ranges from 50° C. to 70° C. Thus, the biological active component can be effectively volatilized, the biological active component will not be decomposed at a high temperature, and adverse effects of higher temperature and faster volatilization speed on the health of the pet can be avoided.

Further, a heat conducting sheet is further disposed between the heating member and the drug carrying member, the heat conducting sheet being a good heat conductor for uniformly conducting heat generated by the heating member to the drug carrying member. Thus, the drug carrying member is more uniformly heated, and the volatilization speed of the biological active component is also more constant.

Further, the heating portion is mounted on an upper portion of the circuit board by a bracket, the battery is mounted on the other side of the circuit board opposite to the heating portion, and the bracket is used to support the heating portion such that a distance between the heating portion and the circuit board is not less than 10 mm. The bracket can isolate the heating portion from the circuit board and the battery, so as to avoid aging of the circuit board or the battery caused by the effect of the high temperature of the heating portion on the circuit board and the battery.

Preferably, the drug carrying member is a microporous organic polymer colloidal particle or inorganic particle, the organic polymer colloidal particle including microporous foaming colloidal particles or silica gel particles, and the inorganic particle including diatomaceous earth particles or microporous ceramic particles.

Preferably, the biological active component is loaded on a surface and an interior of the drug carrying member, and the biological active component includes natural plant essential oils or insecticides having a repellent or killing effect on the pet surface parasites.

Further, a liftable flap is further disposed at a side of the housing close to the body of the pet, and the drug carrying member can be put into or taken out of the mounting groove by lifting the flap. Thus, it is more convenient to mount and replace the drug carrying member.

Preferably, a spring is further disposed inside the flap, the top end of the spring is fixedly connected to the flap, and the drug carrying member is pressed against the bottom of the mounting groove by an elastic force of the spring when the flap is closed. The spring can press the drug carrying member against the bottom of the mounting groove to facilitate heat transfer, and can also prevent the drug carrying member from sliding or falling off.

Preferably, the volatilization holes are provided in the flap.

Specifically, the battery is a rechargeable storage battery.

Further, the circuit board is provided with a charging interface for charging the battery. The circuit board can perform charging management on the battery, and after a charging cable is inserted into the charging interface, the storage battery can be conveniently charged.

DETAILED DESCRIPTION OF THE INVENTION

The present utility model will be further described in detail below with reference to the accompanying drawings.

Figure 1:
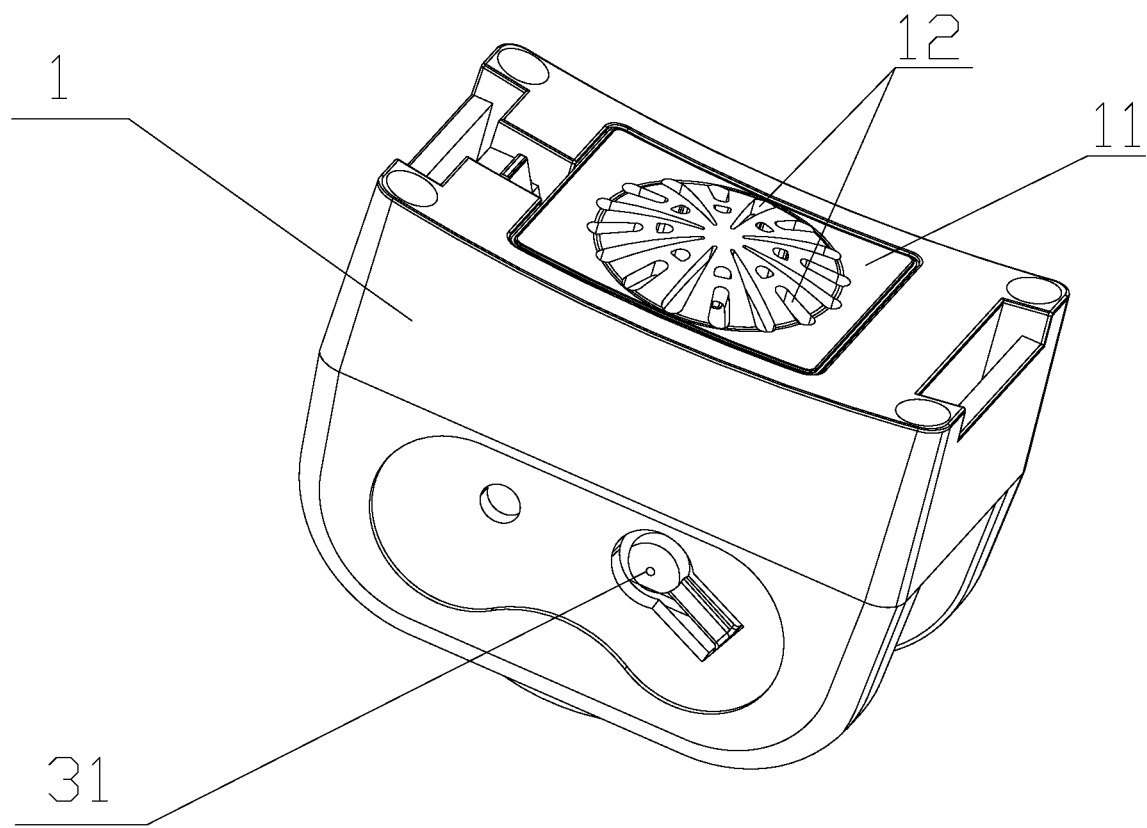
FIG. 1 is a schematic structure view of a pet insect repeller according to an embodiment of the present utility model.
Figure 2:
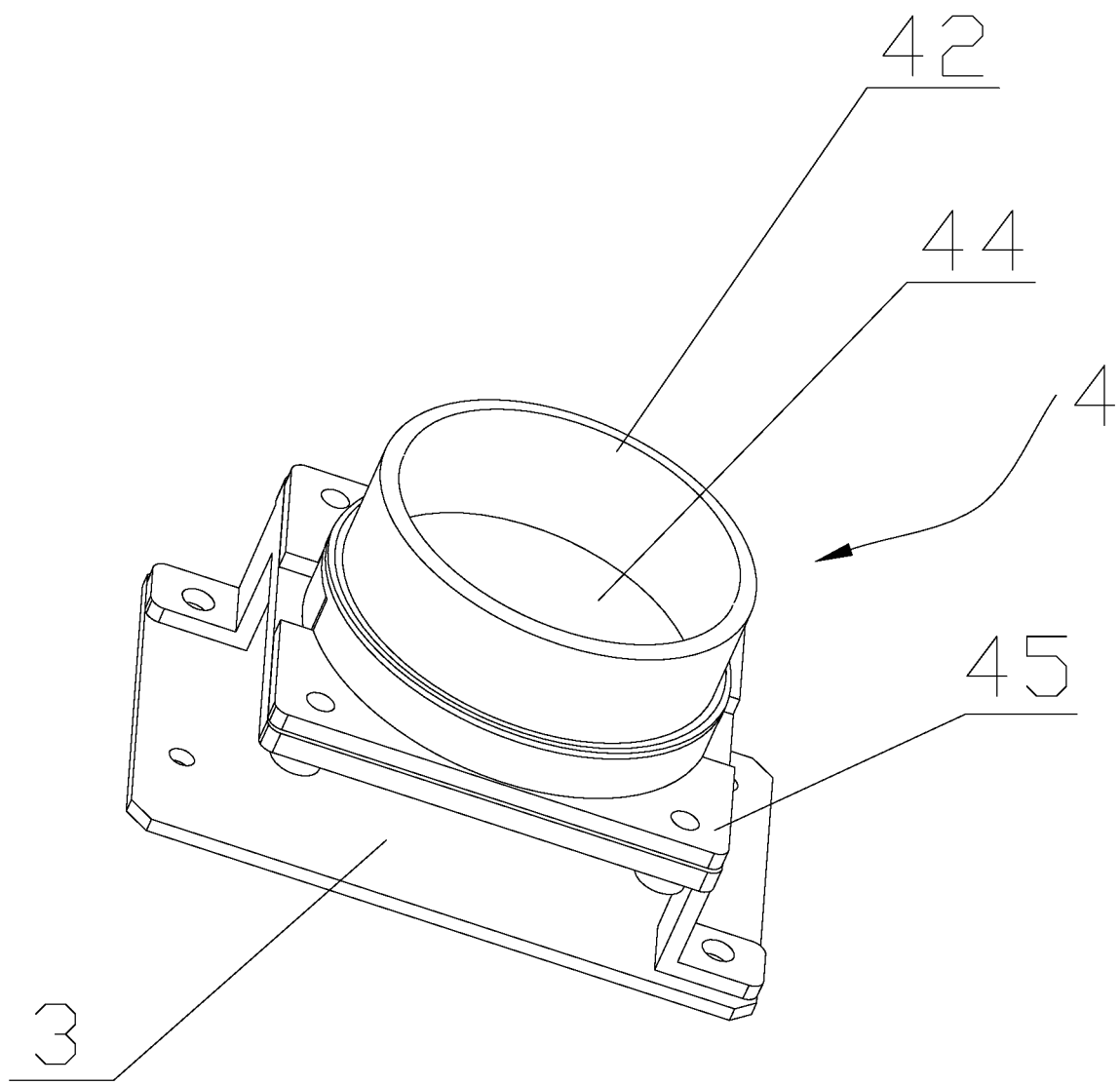
FIG. 2 is a schematic structure view of a heating portion shown in FIG. 1.
Figure 3:
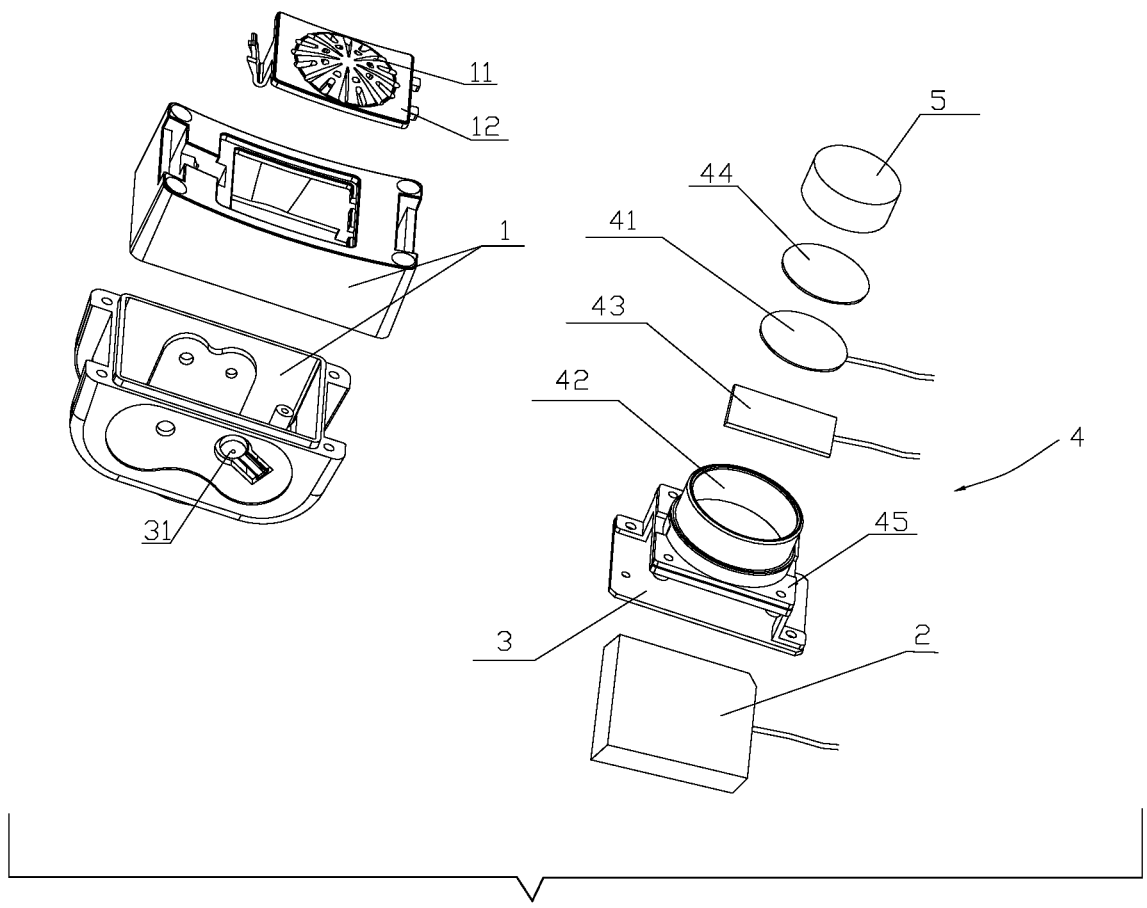
FIG. 3 is an assembly view of the pet insect repeller shown in FIG. 1.
Figure 4:
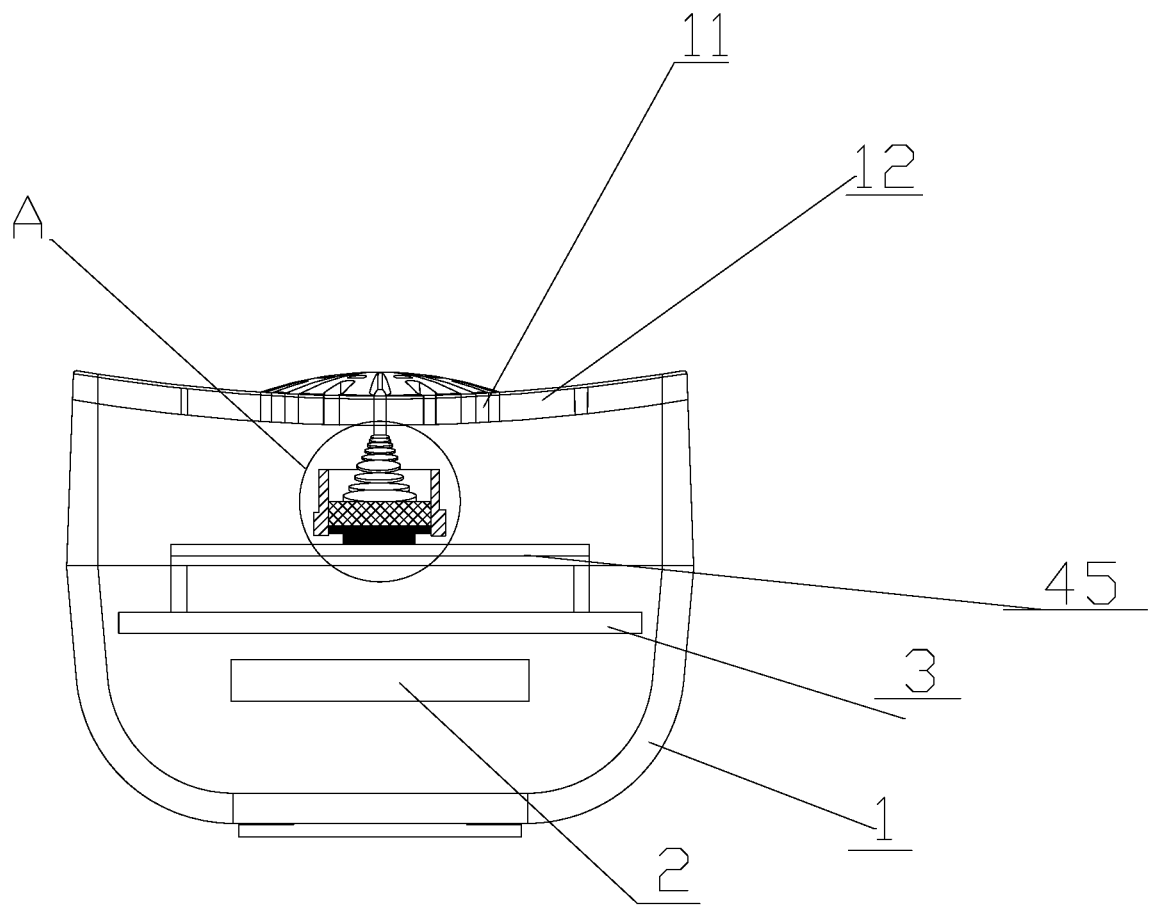
FIG. 4 is a cross-sectional view of the pet insect repeller shown in FIG. 1.
Figure 5:
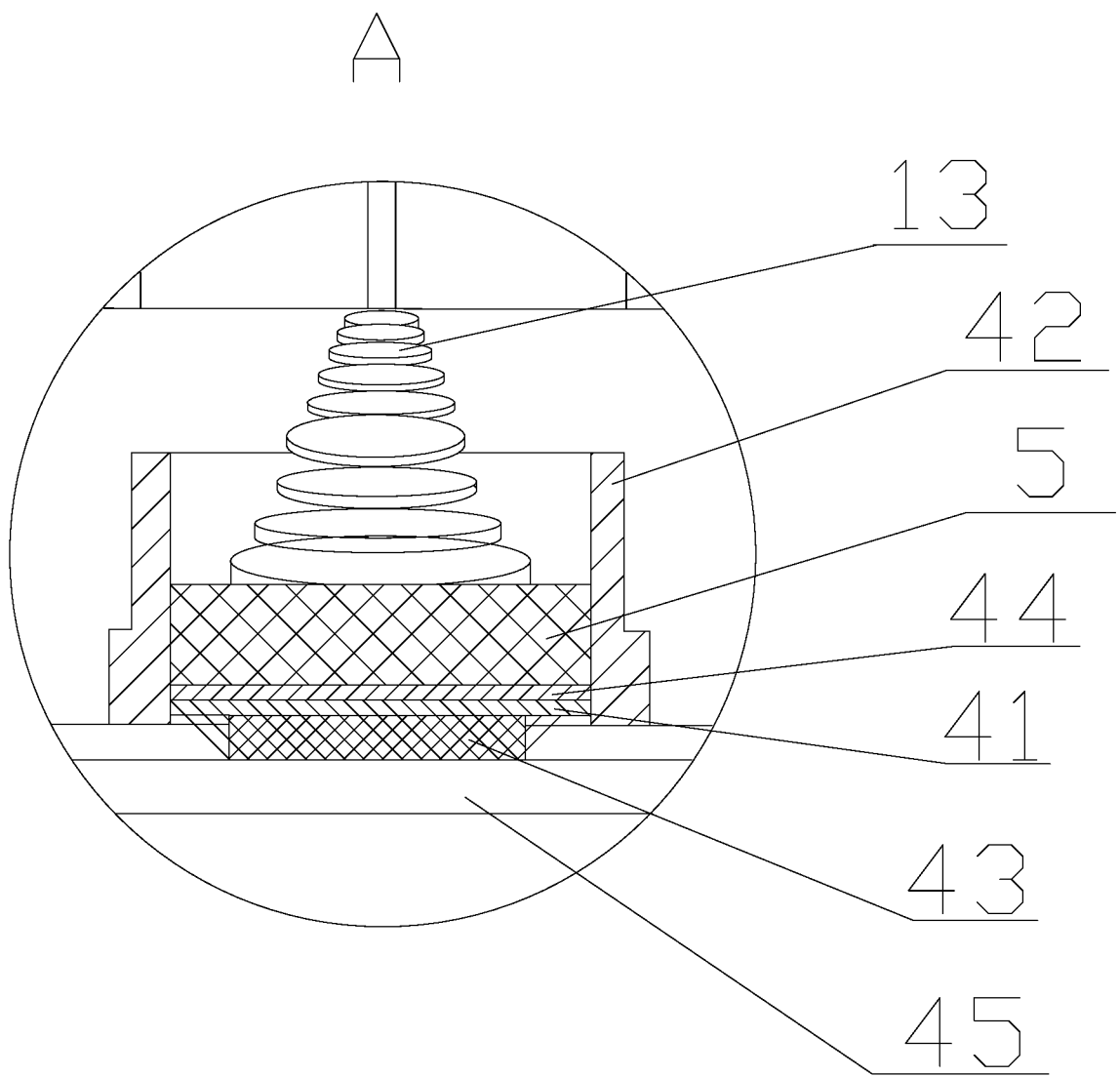
FIG. 5 is an enlarged view of Part A shown in FIG. 4.

FIG. 1 to FIG. 5 schematically show a pet insect repeller according to an embodiment of the present utility model. The device is generally tied to the neck of a pet by a strap.

As shown in the figures, the device includes a housing 1, and a battery 2, a circuit board 3 and a heating portion 4 mounted inside the housing 1.

The battery 2 and a heating plate 4 are respectively connected to the circuit board 3.

The circuit board 3 is provided with an electronic circuit for performing power management on the battery 2 and switch control on the heating portion 4.

A side of the housing 1, close to the pet, is provided with a plurality of through volatilization holes 11.

The heating portion 4 is provided with a drug carrying member 5.

The drug carrying member 5 is loaded with a biological active component.

The biological active component has a repellent and killing effect on pet surface parasites.

The battery 2 is used to provide an operating current for the heating portion 4.

After the battery 2 is turned on, the heating portion 4 generates heat to heat the drug carrying member 5.

After the temperature of the drug carrying member 5 rises, the biological active component is volatilized and diffused to the body surface of the pet through the volatilization holes 11, kills the pet surface parasites, and provides chemical protection for the pet.

According to the pet insect repeller adopting the above technical solution, the biological active component is diffused to the body surface of the pet by heating and volatilizing, and will not be exposed. The pet does not ingest it while licking hairs. It is unnecessary to take coercive measures such as an Elizabeth hood. The pet insect repeller is very convenient to use and will not harm the pet.

The heating portion 4 mainly includes a heating member 41.

The heating member 41 is connected to the circuit board 3.

The heating member 41 is disposed at the bottom of a mounting groove 42.

The mounting groove 42 is open toward the volatilization hole 11.

The drug carrying member 5 is mounted in the mounting groove 42 with a bottom attached to the heating member 41. The drug carrying member 5 is placed at the bottom of the mounting groove 42, the mounting groove 42 can function for heat preservation, the temperature rise rate of the drug carrying member 5 can be increased, and the temperature holding time can be prolonged.

In the present embodiment, the heating member 41 is connected to a temperature control switch 43.

The temperature control switch 43 is used to detect the temperature of the heating member 41.

The temperature control switch 43 powers off the heating member 41 when the temperature of the heating member 41 rises to a predetermined temperature, and powers on the heating member 41 when the temperature of the heating member 41 is lower than the predetermined temperature, so as to maintain the temperature of the heating member 41 within a certain range. Thus, the temperature of the drug carrying member 5 can be effectively controlled, and the biological active component therein can be uniformly volatilized, so as to obtain a relatively stable repellent and killing effect.

Specifically, a predetermined temperature at which the temperature control switch 43 operates is 60° C. Thus, the temperature of the heating member 41 can be stabilized in an appropriate range.

The temperature of the heating member 41 ranges from 50° C. to 70° C. Thus, the biological active component can be effectively volatilized, the biological active component will not be decomposed at a high temperature, and the adverse effects of higher temperature and faster volatilization speed on the health of the pet can be avoided.

Further, a heat conducting sheet 44 is further disposed between the heating member 41 and the drug carrying member 5.

The heat conducting sheet 44 is a good heat conductor for uniformly conducting heat generated by the heating member 41 to the drug carrying member 5. Thus, the drug carrying member 5 is more uniformly heated, and the volatilization speed of the biological active component is also more constant.

In the present embodiment, the heating portion 41 is mounted on an upper portion of the circuit board 3 by a bracket 45.

The battery 2 is mounted on the other side of the circuit board opposite to the heating portion, and the bracket 45 is used to support the heating portion 41 such that a distance between the heating portion 41 and the circuit board 3 is not less than 10 mm. The bracket 45 can isolate the heating portion 41 from the circuit board 3 and the battery 2, so as to avoid aging of the circuit board 3 or the battery 2 caused by the effects of the high temperature of the heating portion 41 on the circuit board 3 and the battery 2.

Preferably, the drug carrying member 5 is a microporous organic polymer colloidal particle or inorganic particle, the organic polymer colloidal particle including microporous foaming colloidal particles or silica gel particles, and the inorganic particle including diatomaceous earth particles or microporous ceramic particles.

Preferably, the biological active component is loaded on a surface and an interior of the drug carrying member, and the biological active component includes natural plant essential oils or insecticides having a repellent or killing effect on the pet surface parasites.

The natural plant essential oil is mainly at least one of cinnamon oil, *eucalyptus* oil and *Litsea cubeba* oil.

The insecticide is a pyrethroid insecticide.

In the present embodiment, a liftable flap 12 is further disposed at a side of the housing 1 close to the body of the pet, and the drug carrying member 5 can be put into or taken out of the mounting groove 42 by lifting the flap 12. Thus, it is more convenient to mount and replace the drug carrying member 5.

A spring 13 is further disposed inside the flap 12.

The top end of the spring 13 is fixedly connected to the flap 12, and the drug carrying member 5 is pressed against the bottom of the mounting groove 42 by an elastic force of the spring 13 when the flap 12 is closed. The spring 13 can press the drug carrying member 5 against the bottom of the mounting groove 42 to facilitate heat transfer, and can also prevent the drug carrying member 5 from sliding or falling off.

The volatilization holes 11 are generally disposed on the flap 12.

In the present embodiment, the battery 2 is a rechargeable storage battery.

The circuit board 3 is provided with a charging interface 31 for charging the battery 2. The circuit board 3 can perform charging management on the battery, and after a charging cable is inserted into the charging interface 31, the storage battery can be conveniently charged.

What have been described above are only some embodiments of the present utility model. It will be apparent to those of ordinary skill in the art that various modifications and improvements can be made without departing from the creative idea of the present utility model. These modifications and improvements fall within the scope of protection of the present utility model.

What is claimed is:

1. A pet insect repeller, tied to the neck of a pet by a strap, comprising a housing, and a battery, a circuit board and a heating portion mounted inside the housing, wherein the battery and a heating plate are respectively connected to the circuit board; the circuit board is provided with an electronic circuit for performing power management on the battery and switch control on the heating portion; a side of the housing, close to the pet, is provided with a plurality of through volatilization holes; the heating portion is provided with a drug carrying member that is loaded with a biological active component; the biological active component has a repellent and killing effect on pet surface parasites; the battery is used to provide an operating current for the heating portion; after the battery is turned on, the heating portion generates heat to heat the drug carrying member; and after the temperature of the drug carrying member rises, the biological active component is volatilized and diffused to the body surface of the pet through the volatilization holes, kills the pet surface parasites, and provides chemical protection for the pet; the heating portion mainly comprises a heating member, the heating member being connected to the circuit board, the heating member being disposed at the bottom of a mounting groove, the mounting groove being open toward the volatilization hole, and the drug carrying member being mounted in the mounting groove with a bottom attached to the heating member.

2. The pet insect repeller according to claim 1, wherein the heating member is connected to a temperature control switch for detecting the temperature of the heating member, the temperature control switch powering off the heating member when the temperature of the heating member rises to a predetermined temperature, and powering on the heating member when the temperature of the heating member is lower than the predetermined temperature, so as to maintain the temperature of the heating member within a certain range.

3. The pet insect repeller according to claim 2, wherein a predetermined temperature at which the temperature control switch operates is 60° C.

4. The pet insect repeller according to claim 2, wherein the temperature of the heating member ranges from 50° C. to 70° C.

5. The pet insect repeller according to claim 1, wherein a heat conducting sheet is further disposed between the heating member and the drug carrying member, the heat conducting sheet being a good heat conductor for uniformly conducting heat generated by the heating member to the drug carrying member.

6. The pet insect repeller according to claim 1, wherein the heating portion is mounted on an upper portion of the circuit board by a bracket, the battery is mounted on the other side of the circuit board opposite to the heating portion, and the bracket is used to support the heating portion such that a distance between the heating portion and the circuit board is not less than 10 mm.

7. The pet insect repeller according to claim 1, wherein the drug carrying member is a microporous organic polymer colloidal particle or inorganic particle, the organic polymer colloidal particle comprising microporous foaming colloidal particles or silica gel particles, and the inorganic particle comprising diatomaceous earth particles or microporous ceramic particles.

8. The pet insect repeller according to claim 1, wherein the biological active component is loaded on a surface and an interior of the drug carrying member, and the biological active component comprises natural plant essential oils or insecticides having a repellent or killing effect on the pet surface parasites.

9. The pet insect repeller according to claim 1, wherein a liftable flap is further disposed at a side of the housing close to the body of the pet, the drug carrying member can be put into or taken out of the mounting groove by lifting the flap, a spring is further disposed inside the flap, the top end of the spring is fixedly connected to the flap, and the drug carrying member is pressed against the bottom of the mounting groove by an elastic force of the spring when the flap is closed.

* * * * *